(12) United States Patent
Ahmed et al.

(10) Patent No.: US 7,502,768 B2
(45) Date of Patent: Mar. 10, 2009

(54) SYSTEM AND METHOD FOR PREDICTING BUILDING THERMAL LOADS

(75) Inventors: Osman Ahmed, Hawthorne Woods, IL (US); Kenneth Lemke, Sturtevant, WI (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 321 days.

(21) Appl. No.: 11/005,262

(22) Filed: Dec. 6, 2004

(65) Prior Publication Data
US 2005/0192915 A1   Sep. 1, 2005

Related U.S. Application Data

(60) Provisional application No. 60/548,676, filed on Feb. 27, 2004.

(51) Int. Cl.
G06E 1/00 (2006.01)
G06E 3/00 (2006.01)
G06F 15/18 (2006.01)
G06G 7/00 (2006.01)

(52) U.S. Cl. .......................... 706/21; 706/30

(58) Field of Classification Search .............. 706/21, 706/30, 15; 236/46 R
See application file for complete search history.

(56) References Cited

U.S. PATENT DOCUMENTS 6,095,426 A * 8/2000 Ahmed et al. .............. 236/49.3
6,454,177 B1 * 9/2002 Sasao et al. ................. 236/46 R
6,757,591 B2 * 6/2004 Kramer ....................... 700/288
7,127,327 B1 * 10/2006 O'Donnell et al. .......... 700/286
2002/0082747 A1 * 6/2002 Kramer ....................... 700/276

OTHER PUBLICATIONS

Kishan Mehrotra, Elements of Artificial Neural networks, 1997, MIT, 136-139.*
Soteris Kalogirou, Artificial neural networks in renewable energy systems applications: a review, 2001, Pergamon, 373-401.*

* cited by examiner

*Primary Examiner*—Joseph P Hirl

(57) ABSTRACT

A system for forecasting predicted thermal loads for a building comprises a thermal condition forecaster for forecasting weather conditions to be compensated by a building environmental control system and a thermal load predictor for modeling building environmental management system components to generate a predicted thermal load for a building for maintaining a set of environmental conditions. The thermal load predictor of the present invention is a neural network and, preferably, the neural network is a recurrent neural network that generates the predicted thermal load from short-term data. The recurrent neural network is trained by inputting building thermal mass data and building occupancy data for actual weather conditions and comparing the predicted thermal load generated by the recurrent neural network to the actual thermal load measured at the building. Training error is attributed to weights of the neurons processing the building thermal mass data and building occupancy data. Iteratively adjusting these weights to minimize the error optimizes the design of the recurrent neural network for these non-weather inputs.

22 Claims, 4 Drawing Sheets

SYSTEM AND METHOD FOR PREDICTING BUILDING THERMAL LOADS

This application claims the benefit of U.S. Provisional Patent Application Ser. No. 60/548,676 filed on Feb. 27, 2004 which is incorporated herein by reference.

FIELD OF THE INVENTION

This invention relates to systems for generating control parameters for building environmental management systems and, more particularly, to systems for predicting thermal conditions to be encountered by a building environmental management system.

BACKGROUND OF THE INVENTION

Most commercial properties include a number of building systems that monitor and regulate various functions of the building for the comfort and well-being of the tenants. These building systems include security systems, fire control systems, and elevator systems. One prevalent and important building system is the environmental management system.

An environmental management system is used to regulate the temperature and flow of air throughout a building. The air conditioning for a building typically includes one or more chillers for cooling air and one or more heaters for warming air. Fans distribute air conditioned by a chiller or heater into a duct system that directs the flow of air to the various rooms of a building. Dampers are located within the duct system to variably control an opening to a branch of a duct system or to a room. The dampers are maneuvered through a range of movement from being 100% open to 0% open, i.e., closed, by actuators. Also, the speed of a motor that drives a fan is controlled to regulate fan speed and, correspondingly, air flow in the system. An important component of a building environmental management system is the control system that varies the fan motor speed and the position of the various dampers to maintain pressure and flow rate set points for the system.

In a co-pending patent application entitled "System and Method for Developing and Processing Building System Control Solutions" having Ser. No. 10/668,949 filed on Sep. 23, 2003, which is commonly owned by the assignee of this patent, the disclosure of which is hereby expressly incorporated by reference into this patent in its entirety, a remote system is described for generating environmental management system control programs that are downloaded to buildings for implementation on the building environmental management systems. Development of these control programs requires anticipation of the thermal conditions encountered by the building for which the environmental management system compensates.

The capability of an environmental management system to address thermal conditions depends upon the resources available to the system. For example, chillers are used to take heat from air that is circulated through the ductwork and dampers of the system by the fans. Chillers require chilled water in order to perform their cooling function. Most chillers obtain chilled water by melting ice. The formation and storage of ice for addressing the thermal conditions of a building comprise one function that is managed by the environmental management system for a building. The operator of a building environmental management system prefers to use energy to make ice when the demand for the energy is lower and, therefore, cheaper. Typically, the low demand periods occur at night when operational activities of most businesses and homes are diminished. The operator wants to manufacture enough ice to adequately meet the demands of the following day, but ice that is not used the following day represents a wasted expenditure of energy and money. Therefore, accurate predictions of the thermal load that will be encountered by a building at a particular time period are important for the operation of the environmental management system. These predictions are used to operate and manage the resources of the building prior to that particular time period.

In the example presented above, the ice is melted during the following day to provide chilled water for operating the chillers in the environmental management system. Because the thermal conditions in the building change during the day, the amount of chilled water required to maintain the required environmental conditions for the building also change during the day. Consequently, an accurate profile of the thermal load changes as they are expected to occur would be useful for operating the environmental management system so that the right amount of chilled water is available for compensating the current environmental conditions.

One method for predicting building thermal conditions requires the forecasting of conditions that are exogenous to the building, namely, weather conditions, and the use of these predicted weather conditions in an energy simulation software package. Such energy simulation software is available from the Department of Energy. In order for the software to operate, however, building configuration data must be collected and input in the software. The building configuration data includes geometrical dimensions, orientation of the building, location parameters, and the like. These data are taken one time, but the collection of this data, even on a one time basis, can be labor intensive and costly. Also, additional sensors may be required for the collection of these data and the cost of installing and operating these sensors may be cost prohibitive. Additionally, the computational resources required for the timely generation of predicted thermal loads by this method are significant.

Statistical programs have also been used in an effort to predict building thermal loads. These programs attempt to find a correlation between a predicted load and predicted independent parameters. One problem with statistical programs is the use of a particular function for correlating the inputs to the outputs. For example, a statistical program may use a linear, second degree polynomial, or exponential relationship to correlate inputs to outputs. Determination of the right function is performed using trial and error techniques and the result is applicable only to the particular building for which it was developed. Also, the complexity of fitting a solution for the determined function to multiple variables that behave in a non-linear manner requires the use of complex algorithms for optimizing multiple parameter systems. Furthermore, convergence of solutions is not guaranteed.

What is needed is a system for predicting thermal load conditions for a building to facilitate the development of environmental control solutions.

What is needed is a system for predicting thermal load conditions for a building that is adaptable to multiple buildings.

What is need is a system for predicting thermal load conditions for a building that does not require extensive computational resources for the timely generation of thermal loads.

What is needed is a system that correlates inputs to outputs without requiring a determination of a particular function to which the input/output mapping must conform.

What is needed is a system for predicting thermal load conditions for a building that does not require the installation of additional sensors for a building environmental management system.

SUMMARY OF THE INVENTION

The above limitations of previously known systems and methods may be overcome by a system and method implemented in accordance with the principles of the present invention. A system for forecasting thermal loads for a building comprises a thermal condition forecaster for forecasting weather conditions to be compensated by a building environmental management system and a thermal load predictor for modeling building environmental management system components to generate a predicted thermal load required for maintaining a set of environmental conditions. The thermal condition forecaster uses a simple linear regression model to predict weather conditions from historical weather data.

The thermal load predictor of the present invention is a neural network and, preferably, the neural network is a recurrent neural network that generates the predicted thermal load from short-term data. The design of the recurrent neural network requires selection of a training set size, a recurrency rate, a learning rate, a momentum, and a number for the neurons in a hidden layer of the recurrent neural network. Inputs for the recurrent neural network include an input layer for receiving building thermal mass data and building occupancy data. The input for the building thermal mass data includes input neurons for local outside air temperature, relative humidity, solar radiation, occupancy data, data type data, and measured load data. The design of the recurrent neural network is evaluated by inputting building thermal mass data and building occupancy data for actual weather conditions and comparing the predicted thermal load generated by the recurrent neural network to the actual thermal load measured at the building. An automated neural network optimizer implementing an optimization method, such as a lattice optimization method, is used to minimize the error between predicted values and measured values and adjust the design of the neural network.

Once the neural network design is optimized, training set data are applied to the network and the resulting deviations between the predicted thermal loads for a building and the actual loads are attributed to a non-weather data function. A non-weather data function profile generator maps the thermal load deviations to neural network input sets to generate a non-weather data function profile. The non-weather data function may be expressed as a percentage of a building thermal load over its possible range. This non-weather data function maps thermal loads for a building to sets of input values to the neural network. A non-weather data function profile generated from the mapping of neural network input sets to corresponding values of building thermal loads provides a compensation factor for further refining a thermal load profile generated by the thermal load predictor.

The energy load data obtained from a building environmental management system may be noisy and contain large spikes because the environmental management system uses poor control strategies. Thus, a moving median filter is used to smooth the building data and the weather data. The filtered energy data reflects the energy needs of the building better than the unfiltered data. The weather and building data are provided on a hourly basis although readings from building sensors may be taken more frequently. If the sampling period of the data is less than a hour, then the multiple readings are used to establish an hourly reading, again by calculating a median or a mean for the readings.

The input layer for the system of the present invention includes an input neuron for receiving chiller data, an input neuron for receiving total building cooling load, an input neuron for receiving thermal storage load, and an input neuron for receiving total building energy consumption. The input for chiller data further comprises an input neuron for chiller supply water temperature, an input neuron for chiller return water temperature, and an input neuron for chiller flow rate. Again, hourly readings are used for load predictions. If chiller data are collected more frequently than once an hour, then hourly data values are determined as medians or means of the readings collected within an hour. The input for thermal storage load further comprises an input neuron for supply water temperature, an input neuron for return water temperature, and an input neuron for flow rate. The data for thermal storage load are also adjusted to provide hourly measurements, if necessary.

By including non-weather data as inputs to the recurrent neural network, the neural network is trained to generate the response of the building to the weather predicted to occur at a building. Thus, the control parameters for a building environmental management system are not simply statistical estimates of previously measured building steady state demands and building peak energy demands for similar weather conditions. Furthermore, by using short-term data to generate the predicted thermal loads, the system of the present invention does not require large resources for the archiving of past weather data and building response data. Instead, a sliding window of recently measured data helps smooth the data that are used for generating the predicted thermal loads.

A method for forecasting thermal loads for a building includes collecting building and weather data from a building system and weather forecasting system, generating a set of forecasted weather conditions and building data from the collected data, and providing the generated data set to a first neural network for the computation of a thermal load prediction. The method may also include archiving the data set and generating a training data set from the archived data. The generated training sets are used for training a second neural network. The method compares the prediction generated by the first neural network to actual measurements taken at the prediction time and determines whether a fault detection has occurred. Any difference between predicted thermal loads and measured thermal loads that are greater than a fault threshold causes a fault detection. The actual measurements are archived so they may be used to generate training predictions for the second neural network.

The method compares the predictions generated by the second neural network to the training predictions and adjusts the weights of the second neural network. When detection faults occur, a copy of the second neural network replaces the first neural network.

As noted above, the generation of the predicted thermal load includes inputting short term data to a recurrent neural network. The inputting of short-term data includes receiving local outside air temperature at a local outside air temperature input neuron, receiving relative humidity at a relative humidity input neuron, receiving solar radiation at a solar radiation input neuron, receiving occupancy data at an occupancy data input neuron, receiving day type data at an day type input neuron, and receiving measured load data at a measured load data input neuron. Inputting measured load data includes receiving chiller data at a chiller data neuron, receiving total building cooling load at a total building cooling load neuron, receiving thermal storage load at a thermal storage load neuron, and receiving total building energy consumption at a total building energy consumption input neuron. Inputting chiller data further comprises receiving chiller supply water temperature at a chiller supply water input neuron, receiving chiller return water temperature at a chiller return water temperature input neuron, and receiving chiller flow rate at a chiller flow rate input neuron. Inputting thermal storage load data includes receiving supply water temperature at a supply water temperature input neuron, receiving return water temperature at a return water temperature input neuron, and receiving flow rate data at a flow rate input neuron.

The system and method of the present invention predict thermal load conditions for a building to facilitate the development of environmental control solutions.

The system and method of the present invention are adaptable to predict thermal load conditions for multiple buildings.

The system and method of the present invention do not require extensive computational resources for the timely generation of thermal loads.

The system and method of the present invention correlate inputs to outputs without requiring a determination of a particular function to which the input/output mapping must conform.

The system and method of the present invention do not require the installation of additional sensors for a building environmental management system for predicting thermal loads.

These and other advantages and features of the present invention may be discerned from reviewing the accompanying drawings and the detailed description of the invention.

BRIEF DESCRIPTION OF THE DRAWINGS

The present invention may take form in various components and arrangement of components and in various methods. The drawings are only for purposes of illustrating exemplary embodiments and alternatives and are not to be construed as limiting the invention.

DESCRIPTION OF THE INVENTION

Figure 1:
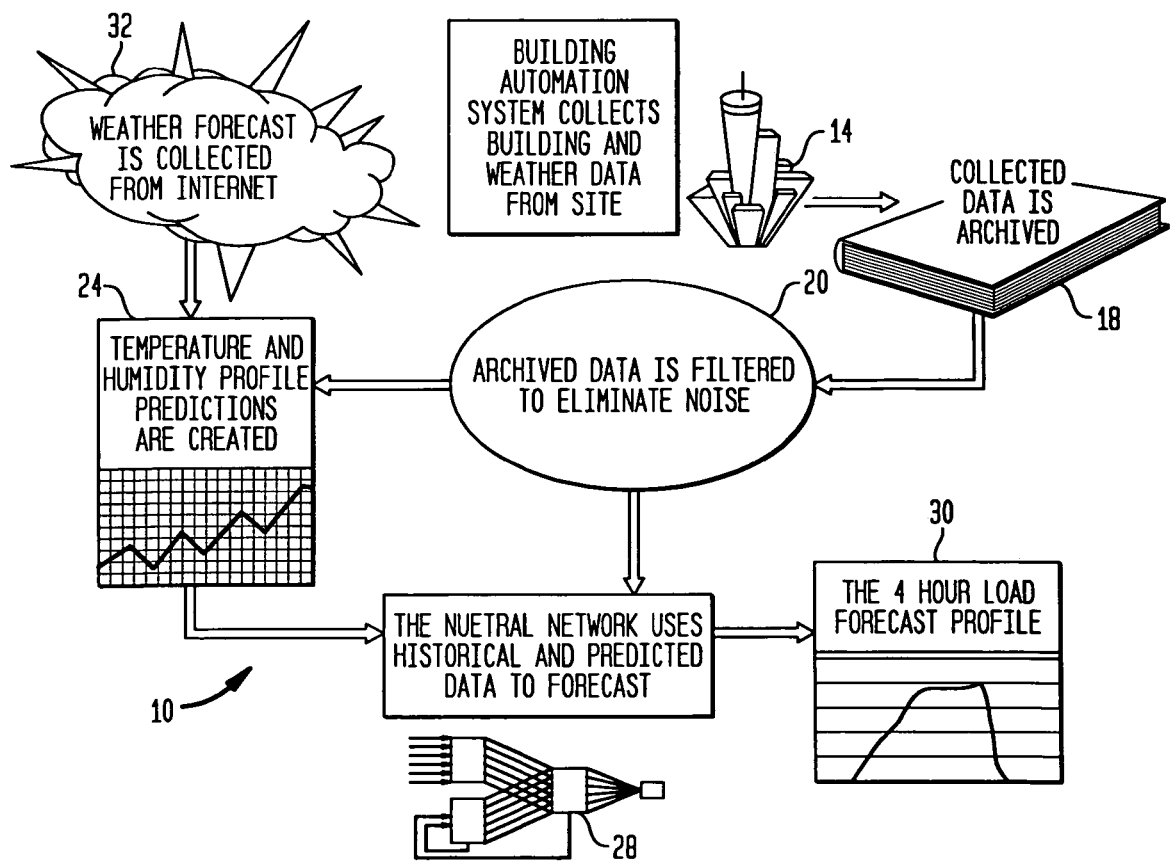
FIG. 1 is a block diagram of a system made in accordance with the principles of the present invention.

A system 10 incorporating the principles of the present invention is shown in FIG. 1. System 10 forecasts thermal loads for a building. A building automation system 14 collects building and weather data at the building site and stores the data in an archive 18. A filter 20, such as a median filter, smoothes the data to reduce spikes that may have been caused by poor control strategies implemented by the building automation system 14. The filtered data is provided to a thermal condition forecaster 24 for forecasting weather conditions to be compensated by a building environmental control system and a thermal load predictor 28 for generating a predicted thermal load profile 30 for maintaining a set of environmental conditions. The thermal load profile 30 is a prediction of the thermal loads for a building as a function of time for some future interval. The thermal condition forecaster 24 also receives weather forecast data from a weather data source 32. The forecaster 24 uses a simple regression model based on forecasted high and low temperatures for a specific locale and measured local temperature and humidity observations made immediately prior to the prediction. The inclusion of the most current observed values of temperature and humidity at the site captures the local influence on the prediction of temperature and humidity. The regression constants in the thermal condition forecaster are calculated using archived data on forecasted high and low temperatures and measured local temperatures and humidity.

Figure 2:
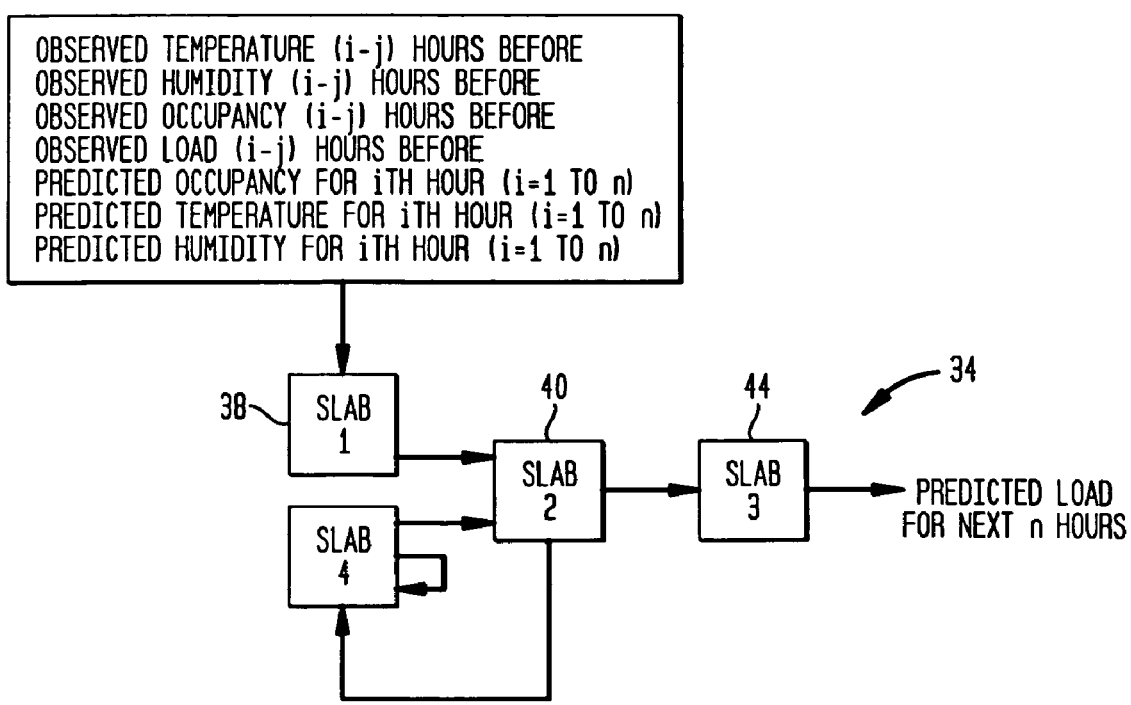
FIG. 2 is a block diagram of a recurrent neural network structure.

The thermal load predictor 28 receives the weather conditions predicted by the thermal condition forecaster 24 as well as the weather and non-weather building data to generate a predicted thermal load 30. The thermal load predictor 28 is a neural network, and, preferably is a recurrent neural network that models the influence of non-weather building components from short-term non-weather building data in the filtered data. This type of neural network is preferred because building thermal load has a significant storage effect and is strongly time dependent. Recurrent processing performed by the recurrent neural network handles time series data well. A recurrent neural network may also be known as a Jordan-Elman neural network. A recurrent neural network 34 is shown in FIG. 2. The neural network 34 includes an input layer 38, a hidden layer 40, and an output layer 44. The input layer 34 typically implements a linear function and the hidden 40 and output 44 layers implement sigmoidal functions.

As is well known, neural networks are trained using training sets. In accordance with the principles of the present invention, short-term training sets are used to train the neural network used to model non-weather building components. The short-term data sets are sets of building and weather data for past intervals of time that are relatively near to the date for a thermal load prediction. Using short-term data for modeling non-weather building components has at least two advantages. For one, the costs of archiving long periods of historical data are avoided. Instead, a sliding window may be used and as data age, the data may be removed from the database. For another, long-term building data are not typically available. That is, most environmental management system operators for buildings have not viewed long-term data as having any real benefit for thermal load forecasting. Consequently, a system made in accordance with the principles of the present invention does not require an environmental management system operator to begin archiving non-weather building data.

Figure 3:
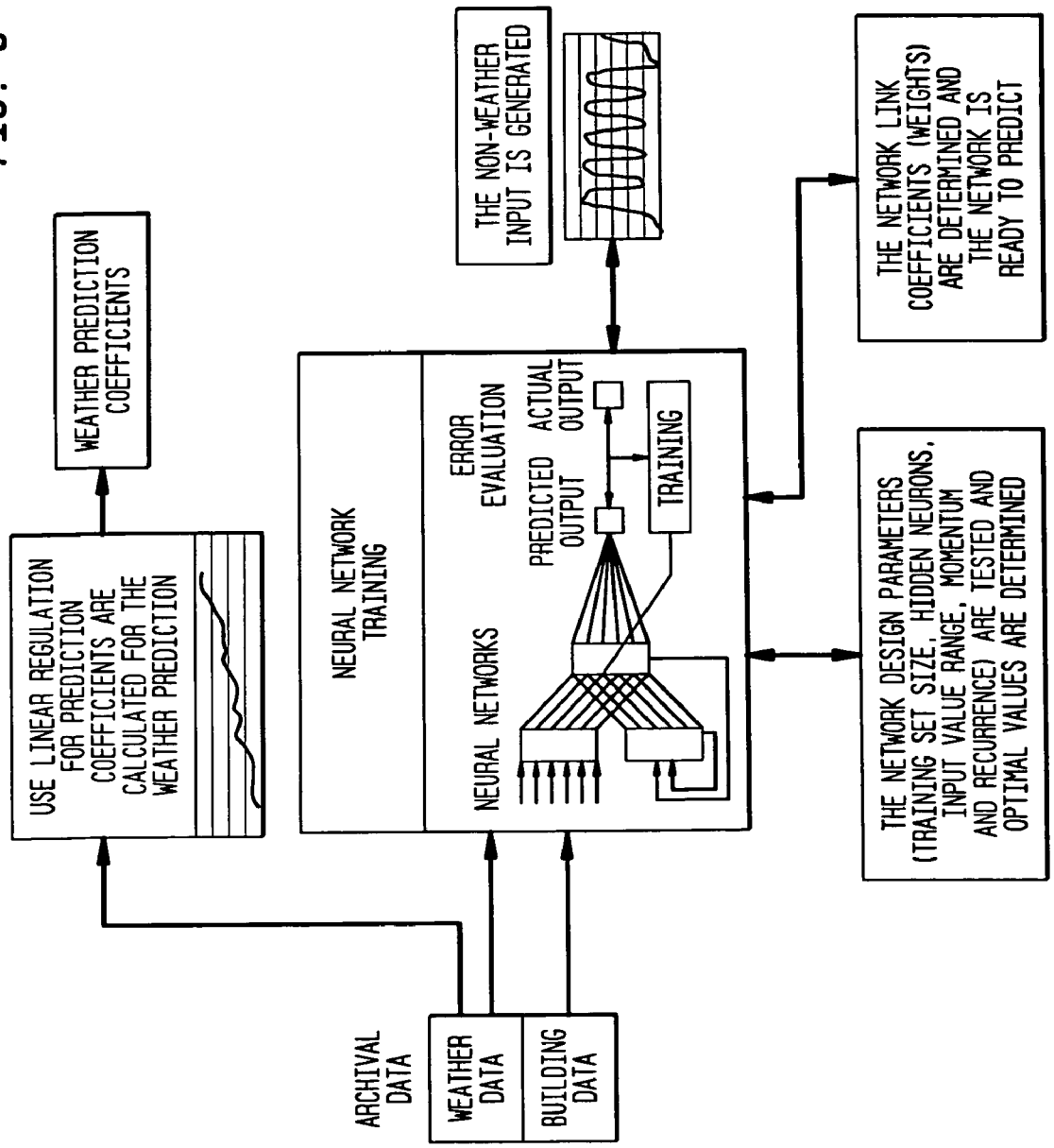
FIG. 3 is a block diagram of a system for generating a non-weather data function profile that may be used to further refine predictions of the thermal load predictor shown in FIG. 1.

A database from which training data sets may be obtained for a particular date preferably includes building data for the twenty-one (21) to forty-two (42) days preceding the prediction date. Data sets used in the continuous prediction system of FIG. 3 are constructed from the building data for the corresponding hour in a previous time period. The size of the time period may be set by the user, but most often the time period will be 24 hours in length. Thus, if the hour for which a thermal prediction is being computed is the thirteenth hour in a day, then the building and weather data from the thirteenth hour in the previous 24 hour period is used. In other words, the building and weather data from the previous twenty-four hours is used for the prediction. The thermal load prediction 30 generated by the thermal load predictor 28 may take the form of an hourly load profile for the next 24 hours that is updated every 3-6 hours, a total energy requirement for a day that is issued 6 hours before the day commences, or identification of the hour in the next day in which the maximum energy demand will occur.

The recurrent neural network of the present invention is designed by selecting a training set size, a recurrency rate, a learning rate, momentum, and the number of hidden neurons to be used in the hidden layer of the recurrent neural network. A system made in accordance with the principles of the present invention may include an automated neural network optimizer that automates a process for selecting and optimizing neural network parameters. For example, a simple lattice search optimization method may be implemented by an automated neural network optimizer to optimize these parameters for designing a neural network. In this exemplary method, a neural network parameter is selected and the error between a set of values predicted by the neural network and a set of measured values is minimized with reference to the selected parameter. Neural network parameters that are computationally intensive to calculate are selected once and left unchanged. This automated process may be used to adapt a neural network for predicting energy loads for a building.

This training process may be incorporate within the continuously operational thermal load prediction system shown in FIG. 3 and described in more detail below. The weather data are also provided to weather condition forecaster 24.

Weather condition forecaster 24 uses a linear regression analysis to predict weather conditions for the particular date and time for which a building thermal load is being generated. These conditions are likewise compared to the actual conditions so that the coefficients of the linear regression model may be adjusted. This aspect of the training of system 10 is also shown in FIG. 3.

In addition to the training for optimization of the neural network parameters, non-weather building parameters need to be incorporated in the predictions generated by the neural network. These factors include building occupancy, the type of day for which the load is being forecasted, and the building thermal mass for a predicted load. The type of day refers to whether the day is a week day, weekend day, holiday, or the like. These factors are included by generating a non-weather data profile that is used to adjust the thermal load prediction of the neural network.

Training sets are applied to the inputs of the thermal load predictor 28 as designed by the automated process described above. The outputs are compared to the actual values that correspond to a training set. The error between the predicted value output by the neural network and the actual value is attributed to a non-weather input function. A non-weather data function profile generator maps the thermal load deviations to neural network input sets to generate a non-weather data function profile. The non-weather data function profile generator may be implemented by an computer program that correlates output values to input sets for determining functions. The non-weather data function may be expressed as a percentage of a building thermal load over its possible range. This non-weather data function maps a thermal load for a building to a set of input values. A value of zero represents the absence of thermal load attributable to non-weather factors such as the level of building occupancy, the level of thermal load generated by tenant equipment, such as computers or other electrical equipment, and the like. A value of one represents the thermal load of a fully occupied building with all thermal sources, such as electrical equipment, generating thermal loads at 100% of their capacity. A non-weather data function profile generated from the mapping of neural network input sets to corresponding values of building thermal loads provides a compensation factor for further reducing the error in the thermal loads predicted by the neural network. This non-weather data function profile is generated by the process shown in FIG. 4.

The input layer of the recurrent neural network includes inputs for receiving local outside air temperature, relative humidity, solar radiation, occupancy data, data type data, and measured load data. The inputs for the measured load data also include an input neuron for receiving chiller data, an input neuron for receiving total building cooling load, an input neuron for receiving thermal storage load, and an input neuron for receiving total building energy consumption. The chiller data input may be further defined to include an input neuron for chiller supply water temperature, an input neuron for chiller return water temperature, and an input neuron for chiller flow rate. The thermal storage load input may further include an input neuron for supply water temperature, an input neuron for return water temperature, and an input neuron for flow rate.

Figure 4:
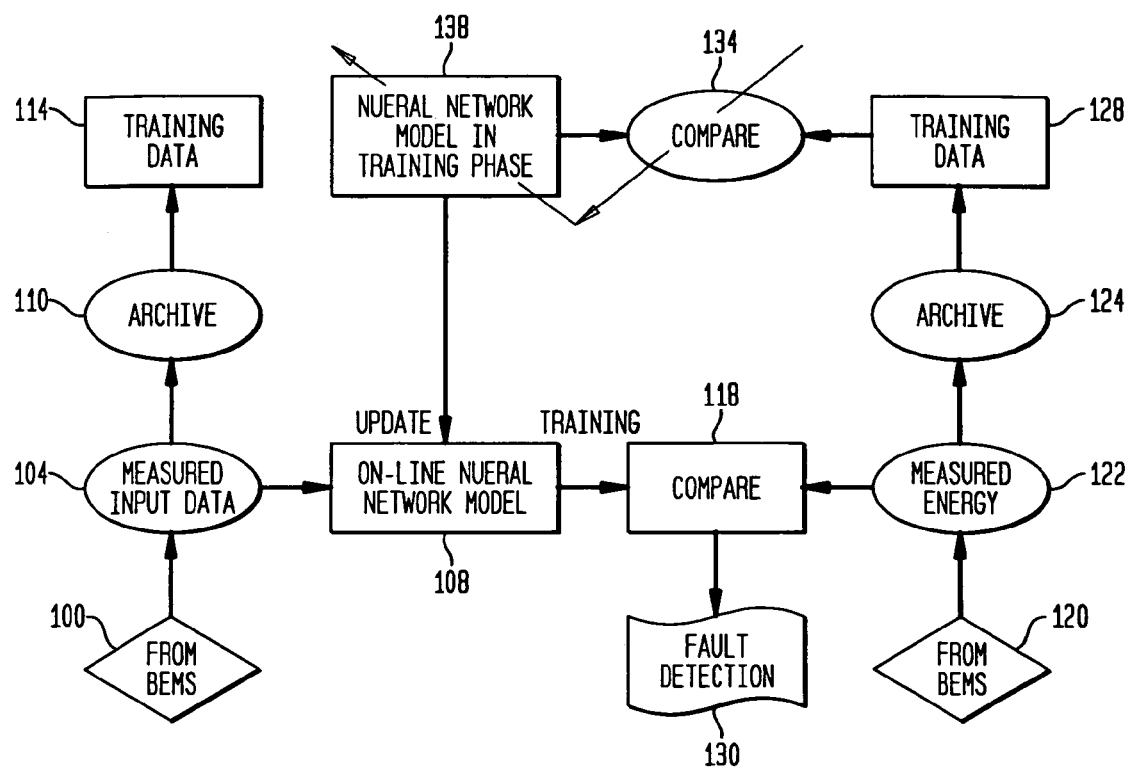
FIG. 4 is a block diagram of a continuous prediction system having an on-line neural network and a training neural network

A method for forecasting energy demand for a building is shown in FIG. 4. After a neural network design has been optimized and a non-weather data function profile has been generated, the on-line method of FIG. 3 may commence. The method includes the collecting of building and weather data from a building system and weather forecasting system (block 100). A data set of forecasted weather conditions and building data are prepared (block 104) and provided to the on-line neural network for the computation of a thermal load prediction (block 108). The data set is also archived for later reference (block 110) and the generation of training sets for the training phase neural network (114). The prediction generated by the on-line neural network is compared to actual measurements taken at the prediction time (block 118). The actual measurements are provided by the building environmental system (blocks 120, 122). The measurements of the actual building conditions are archived (block 124) so they may be used to generate training predictions (block 128) for the corresponding archived input data. Any difference between predicted thermal loads and measured thermal loads that are greater than a fault threshold causes a fault detection (block 130). The training set corresponding to the input data for the on-line neural network is input to the training neural network for the generation of a thermal load prediction (block 134). The resulting prediction is compared to the training predictions obtained from the actual measurements and the error between the values is minimized (block 138). If the minimization requires adjustments to the training neural network, these adjustments are downloaded to the on-line neural network after they are confirmed with other training sets and training predictions.

As noted above, the generation of the predicted thermal load includes inputting short term data to a recurrent neural network. The inputting of short-term data includes receiving local outside air temperature at a local outside air temperature input neuron, receiving relative humidity at a relative humidity input neuron, receiving solar radiation at a solar radiation input neuron, receiving occupancy data at an occupancy data input neuron, receiving day type data at an day type input neuron, and receiving measured load data at a measured load data input neuron. Inputting measured load data includes receiving chiller data at a chiller data neuron, receiving total building cooling load at a total building cooling load neuron, receiving thermal storage load at a thermal storage load neuron, and receiving total building energy consumption at a total building energy consumption input neuron. Inputting chiller data further comprises receiving chiller supply water temperature at a chiller supply water input neuron, receiving chiller return water temperature at a chiller return water temperature input neuron, and receiving chiller flow rate at a chiller flow rate input neuron. Inputting thermal storage load data includes receiving supply water temperature at a supply water temperature input neuron, receiving return water temperature at a return water temperature input neuron, and receiving flow rate data at a flow rate input neuron.

The neural networks shown in FIG. 4 may be implemented on, for example, a computer system having at least a Pentium 4 processor operating at 1.8 GHz with 128 MB of RAM and a 60 GB hard drive. Neuroshell software or other off-the-shelf neural network software may be used for the design, development, and testing of the recurrent networks used to implement the thermal load predictor.

In operation, building data are collected and filtered for archival and later use. Design constraints for a neural network are selected and optimized. Training sets are applied to the neural network. The thermal load predictions are compared to actual measured loads and the deviations are attributable to a non-weather function for the building. A non-weather data function profile is generated by mapping input sets to a thermal load value. This profile is used to adjust the thermal load profiles generated by the thermal predictor 28. The training neural network then becomes the on-line thermal predictor.

In the on-line mode of operation, the on-line thermal predictor is provided data sets that are also provided to a training neural network. The prediction of the on-line neural network is compared to the measured actual conditions. The on-line neural network continues to operate until fault detection occurs. The training neural network also has its prediction compared to the actual conditions, but its weights are adjusted to continue refinement of the system. Once a fault is detected, the training neural network is downloaded to the computer executing the on-line neural network so that a copy of the training neural network becomes the on-line neural network used to implement the thermal predictor. This continuous operation of the on-line neural network proceeds until a fault detection occurs and the on-line neural network is replaced with the training neural network.

While the present invention has been illustrated by the description of exemplary processes and system components, and while the various processes and components have been described in considerable detail, applicants do not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicants' general inventive concept.

What is claimed is:

1. A system for forecasting thermal loads for a building comprising:
   a thermal condition forecaster for forecasting weather conditions to be compensated by a building environmental management system; and
   a thermal load predictor for modeling environmental management system components and to generate a predicted thermal load for maintaining a set of environmental conditions based at least in part on information representative of the forecasted weather conditions, the thermal load predictor including a recurrent neural network;
   wherein a moving median filter smoothes short term data prior to the processing of the recurrent neural network.

2. The system of claim 1, the recurrent neural network including an input layer having input neurons for receiving building thermal mass data and building occupancy data.

3. The system of claim 2, the input layer for the recurrent neural network further includes:
   an input neuron for receiving local outside air temperature data;
   an input neuron for receiving relative humidity data;
   an input neuron for receiving solar radiation data;
   an input neuron for receiving occupancy data;
   an input neuron for receiving data type data; and
   an input neuron for receiving measured load data.

4. The system of claim 3, the input neurons for receiving measured load data further include:
   an input neuron for receiving chiller data;
   an input neuron for receiving total building cooling load;
   an input neuron for receiving thermal storage load; and
   an input neuron for receiving total building energy consumption.

5. The system of claim 4, the input neuron for chiller data further comprising:
   an input neuron for chiller supply water temperature;
   an input neuron for chiller return water temperature; and
   an input neuron for chiller flow rate.

6. The system of claim 4, the input neuron for thermal storage load further comprising:
   an input neuron for supply water temperature data;
   an input neuron for return water temperature data; and
   an input neuron for flow rate data.

7. The system of claim 1 further comprising:
   an automated recurrent neural network optimizer for optimizing recurrent neural network parameters of the recurrent neural network, the automated recurrent neural network optimizer optimizes a selected neural network parameter by minimizing error between values predicted by the neural network and measured values.

8. The system of claim 7 wherein the automated recurrent neural network optimizer selects one of a training set size, a recurrency rate, a learning rate, a momentum, and a number of hidden neurons as a neural network parameter for optimization.

9. The system of claim 7 wherein the automated recurrent neural network optimizer implements a lattice search optimization method to minimize the error between values predicted by the recurrent neural network and measured values.

10. The system of claim 1 further comprising:
    a non-weather data function profile generator that maps building thermal load deviations to recurrent neural network input sets so that the thermal load profile generated by the recurrent neural network may be adjusted with the non-weather data function profile.

11. The system of claim 1, further comprising a memory storing the predicted thermal load.

12. A method for forecasting thermal loads for a building comprising:
    collecting building and weather data from a building system and weather forecasting system;
    generating a set of forecasted weather conditions and building data from the collected data;
    smoothing a short term data set using a moving median filter;
    providing the smoothed data set to a first recurrent neural network for the computation of a thermal load prediction; and
    operating at least a portion of a building environmental management system based on the thermal load prediction.

13. The method of claim 12 further comprising:
    archiving the data set; and
    generating a training data set from the archived data.

14. The method of claim 13 further comprising:
    comparing the thermal load prediction generated by the first recurrent neural network to actual measurements taken at the prediction time; and
    determining whether a fault detection has occurred.

15. The method of claim 14 further comprising:
    archiving the actual measurements; and
    generating training predictions for the second recurrent neural network.

16. The method of claim 15 further comprising:
    comparing the generated thermal predictions from the second recurrent neural network to the training predictions; and
    adjusting neuron weights for neurons in the second recurrent neural network.

17. The method of claim 16 further comprising:
    replacing the first recurrent neural network with a copy of the second recurrent neural network in response to a fault detection.

18. A method for forecasting thermal loads for a building comprising:
    forecasting weather conditions to be compensated by a building environmental management system; and smoothing a short term data set using a moving median filter; generating a predicted thermal load for maintaining a set of environmental conditions using a recurrent neural network based at least in part on the smoothed information representative of the forecasted weather conditions;

generating a predicted thermal load for maintaining a set of environmental conditions using a neural network based at least in part on the information representative of the forecasted weather conditions; and operating at least a portion of the building environmental management system based on the thermal load prediction.

19. The method of claim 18 further comprising:
optimizing recurrent neural network parameters of the recurrent neural network by minimizing error between values predicted by the neural network and measured values.

20. The method of claim 19 wherein one of a training set size, a recurrency rate, a learning rate, a momentum, and a number of hidden neurons for the recurrent neural network is optimized.

21. The method of claim 19 wherein the recurrent neural network parameter optimization is performed using a lattice search optimization method.

22. The method of claim 19 further comprising:
generating a non-weather data function profile that maps building thermal load deviations to recurrent neural network input sets; and
adjusting the thermal load profile generated by the recurrent neural network with the non-weather data function profile.

* * * * *